United States Patent
Colignon et al.

(10) Patent No.: US 6,837,042 B2
(45) Date of Patent: Jan. 4, 2005

(54) SYSTEM FOR AIDING THE REGENERATION OF POLLUTION-CONTROL MEANS THAT ARE INTEGRATED IN AN EXHAUST LINE OF A MOTOR VEHICLE ENGINE

(75) Inventors: Christophe Colignon, Levallois Perret (FR); Patrice Le Tallec, Sartrouville (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/292,590

(22) Filed: Nov. 13, 2002

(65) Prior Publication Data

US 2003/0089102 A1 May 15, 2003

(30) Foreign Application Priority Data

Nov. 13, 2001 (FR) .......................................... 01 14673

(51) Int. Cl.⁷ ................................................ F01N 3/00
(52) U.S. Cl. .............................. 60/286; 60/295; 60/297; 60/311
(58) Field of Search ........................ 60/285, 286, 295, 60/297, 311

(56) References Cited

U.S. PATENT DOCUMENTS

| | | | |
|---|---|---|---|
| 4,509,327 A | 4/1985 | Enga | |
| 5,722,363 A | * 3/1998 | Iida et al. | 123/305 |
| 5,826,425 A | 10/1998 | Rossi Sebastiano et al. | |
| 5,975,046 A | * 11/1999 | Kaneko et al. | 123/300 |
| 6,560,960 B2 | * 5/2003 | Nishimura et al. | 60/284 |
| 6,588,205 B1 | * 7/2003 | Kumagai et al. | 60/298 |

FOREIGN PATENT DOCUMENTS

| | | |
|---|---|---|
| EP | 0 902 172 A3 | 3/1999 |
| FR | 2 774 428 | 8/1999 |

\* cited by examiner

*Primary Examiner*—Binh Q. Tran
(74) *Attorney, Agent, or Firm*—Westerman, Hattori, Daniels & Adrian LLP

(57) ABSTRACT

This system for aiding the regeneration of pollution-control means (1) that are integrated in an exhaust line (2) of an engine (3) of a motor vehicle, in which the engine is associated with means (6) for the common supply of the cylinders thereof, which means are in a form suitable for injecting fuel, during regeneration, into each cylinder in the form of at least one principal injection and at least one post-injection during the expansion phase of the cylinder, is characterized in that the supply means (6) are in a form suitable for cutting at least the principal injection of at least one of the cylinders in order to increase the oxygen content of the exhaust gases and to optimise the regeneration of the pollution-control means.

13 Claims, 1 Drawing Sheet

US 6,837,042 B2

SYSTEM FOR AIDING THE REGENERATION OF POLLUTION-CONTROL MEANS THAT ARE INTEGRATED IN AN EXHAUST LINE OF A MOTOR VEHICLE ENGINE

TECHNICAL FIELD

The present invention relates to a system for aiding the regeneration of pollution-control means that are integrated in an exhaust line of a motor vehicle engine.

BACKGROUND TO THE INVENTION

For several years now there has been a growing trend towards the integration of pollution-control means in the exhaust lines of motor vehicle engines.

Thus, for example, particulate filters or NOx traps are integrated in these lines in order to reduce the level of pollutant emissions in the environment.

The principle on which particulate filters work consists in trapping the particles emitted in the exhaust gases in order to retain them on the filter.

However, it is necessary to regenerate the filter periodically.

This regeneration is effected by the combustion of the trapped particles.

In order to achieve such combustion, it is necessary to combine a given number of conditions.

Thus, the temperature of the particles must be increased to a predetermined value known as the combustion-triggering value, this increase in temperature being brought about especially by an increase in the temperature of the exhaust gases on the output side of the engine.

However, the gases must also comprise a sufficient quantity of oxygen to ensure the smooth progress of this regeneration and optionally a given amount of unburned hydrocarbons, for example in a case where the particulate filter is catalysed or associated with a separate catalyst.

Specific systems for supplying fuel to engines have therefore been developed in the prior art.

These supply systems are in a form suitable for providing multiple fuel injections into the engine cylinders. These multiple injections comprise, for example, a pre-injection, a principal injection and a post-injection of fuel during the expansion phase of the corresponding cylinder.

The problem associated with using that type of system resides in the fact that the exhaust gases have a low oxygen content, which is unfavourable to the combustion of the particles, that is to say, to the triggering and propagation of this combustion.

The object of the invention is therefore to solve those problems

SUMMARY OF THE INVENTION

To that end, the invention relates to a system for aiding the regeneration of pollution-control means that are integrated in an exhaust line of an engine of a motor vehicle, in which the engine is associated with means for the common supply of the cylinders thereof, which means are in a form suitable for injecting fuel, during regeneration, into each cylinder in the form of at least one principal injection and at least one post-injection during the expansion phase of the cylinder, characterized in that the supply means are in a form suitable for cutting at least the principal injection of at least one of the cylinders in order to increase the oxygen content of the exhaust gases and to optimise the regeneration of the pollution-control means.

BRIEF DESCRIPTION OF DRAWINGS

The invention will be better understood on reading the following description which is given purely by way of example and with reference to the appended drawings, in which.

DESCRIPTION OF PREFERRED EMBODIMENT

Figure 1:
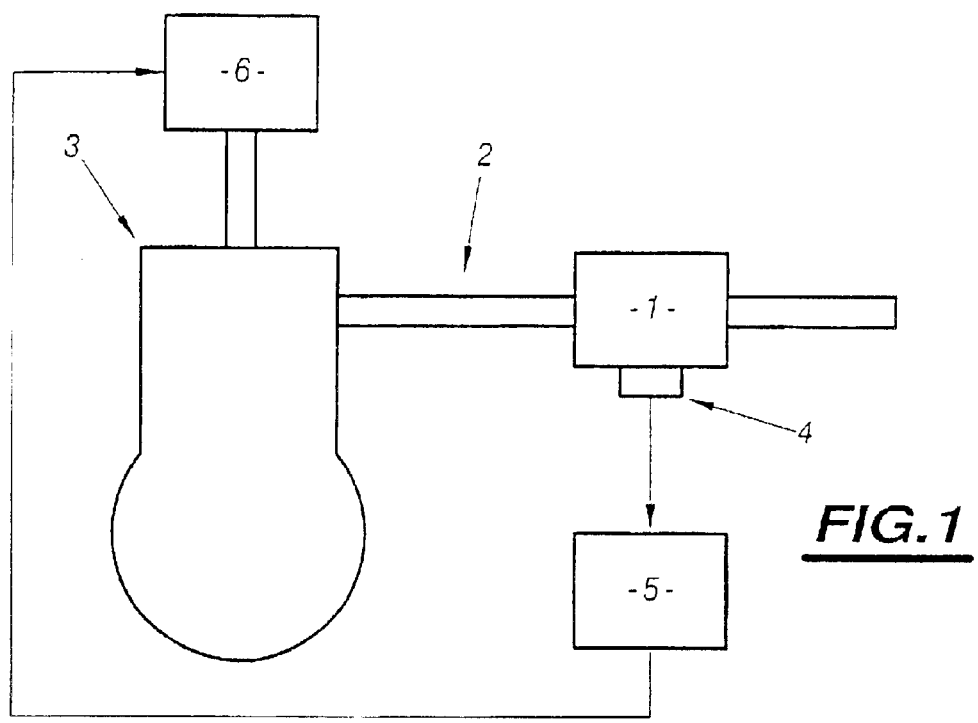
FIG. 1 is a block diagram illustrating the general structure of an aid system according to the invention.

FIG. 1 shows a system for aiding the regeneration of pollution-control means which are designated by the general reference 1 and which are integrated in an exhaust line, designated by the general reference 2, of an engine 3 of a motor vehicle.

The pollution-control means are associated with means 4 for monitoring the state thereof which are connected to data-processing means constituted by any appropriate computer 5 for controlling means 6 for supplying fuel to the engine cylinders.

As is known, during the regeneration of the filter, these supply means are in a form suitable for injecting fuel into each cylinder in the form of at least one principal injection and at least one post-injection during the expansion phase of the cylinder.

Pre-injection is also possible.

As is also known, these multiple injections enable the temperature of the exhaust gases on the output side of the engine, and therefore the temperature of the particles trapped in the pollution-control means, to be increased in order to trigger the combustion thereof, but they also enable unburned hydrocarbons to be produced in the exhaust gases in order to promote regeneration.

According to the invention, the supply means are in a form suitable for cutting at least the principal injection of at least one of the cylinders in order to increase the oxygen content of the exhaust gases and to optimise the regeneration of the pollution-control means.

Figure 2:
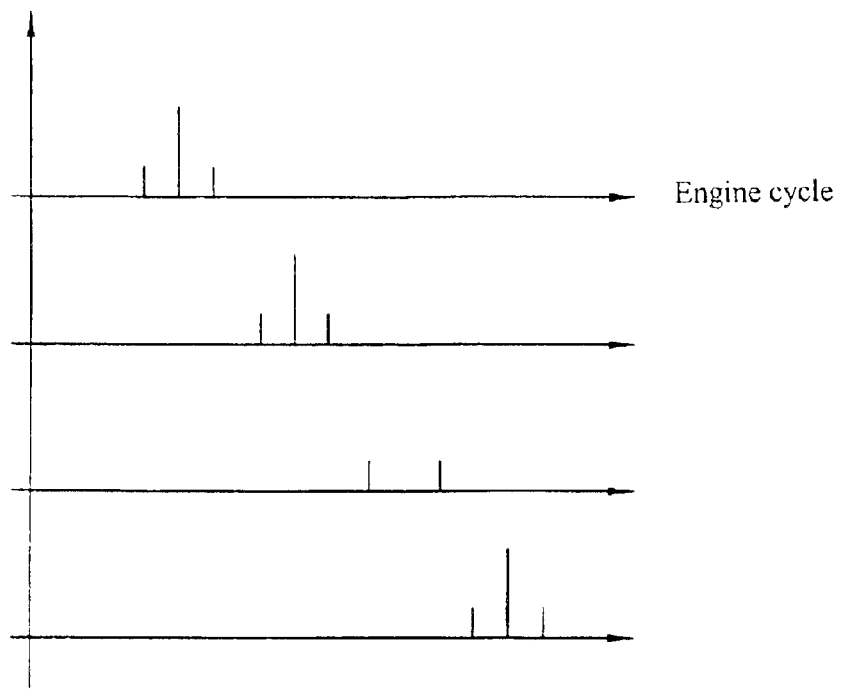
FIG. 2 illustrates fuel injections into the cylinders of an engine.

This is illustrated in FIG. 2 where it can be seen that the principal injection of fuel into the third cylinder has been cut.

This then enables the cylinder for which at least the principal injection has been cut to be transformed into an oxygen pump enabling the exhaust gases to be enriched with oxygen carriers in order to provide rapid and complete combustion, that is to say, a triggering and a propagation of this combustion, of the particles trapped in the pollution-control means.

In a manner which is also known, in a case where the engine is associated with a turbocharger, the energy recovered by the turbine is modified and it is then advantageous to apply a specific turbocharging reference input.

For the other cylinders, multiple injections are used in a conventional manner and may be associated with an increase in the richness of the air-fuel mixture (by reducing airflow by valve regulation, by delivering the gas by EGR or by using any other means permitted, for example, by the use of electromagnetic valves).

By cutting the principal injection of one or more cylinders of the engine while at the same time maintaining a constant torque delivered by the engine, the load on the cylinders functioning normally is increased, which enables the thermal level of the exhaust gases to be increased.

In addition, the cutting of the principal injection may involve a different cylinder at each engine cycle, the consecutive cylinders being, for example, cut one after another by a circular variation in order to cut them in turn.

This enables the operation of the engine to be made uniform while maintaining a minimum thermal level at the exhaust manifold.

A cylinder whose only function is to compress fresh air supplies oxygen which is cold compared with the exhaust gases coming from the other cylinders, which reduces the temperature of the air/exhaust-gas mixture.

By cutting the various cylinders one after another, the reduction in temperature at the exhaust manifold, which reduction is linked with this pumping of air, is compensated for by the thermal level of the following normal cycle(s), so that the average temperature of the gases on the output side is then influenced only slightly by the cutting of the cylinders.

Thus, for example, for a V engine, it is optionally possible to cut a cylinder in a bank of cylinders while never cutting two consecutive engine cycles.

It will therefore be appreciated that such a system enables the combustion of the particles to be promoted by enriching with oxygen the exhaust gases passing through the filtering support, while at the same time creating a high thermal level of the exhaust gases.

Such a system may be used, for example, for any type of supercharged or non-supercharged, turbocharged or non-turbocharged, petrol or diesel, heat engine.

It can be used especially for the regeneration of a catalysed or non-catalysed particulate filter, a NOx trap or a pollution-control system comprising a catalysed or non-catalysed particulate filter associated with a NOx trap.

What is claimed is:

1. A system for aiding the regeneration of pollution-control means that are integrated in an exhaust line of an engine of a motor vehicle, in which the engine has a plurality of cylinders,
    said system comprising means for the common supply of the cylinders of the engine, said supply means being in a form suitable for injecting fuel, during regeneration, into each cylinder in the form of at least one principal injection and at least one post-injection during the expansion phase of the cylinder,
    wherein the supply means comprise means for cutting at least the principal injection of at least one of the cylinders and maintaining at least the principal injection of at least one other of the cylinders, during regeneration, in order to increase the oxygen content of the exhaust gases and to optimise the regeneration of the pollution-control means.

2. A system according to claim 1, wherein the supply means comprise means for cutting the principal injection into a different cylinder at each engine cycle during regeneration.

3. A system according to claim 2, wherein the supply means comprise means for cutting the principal injection of the consecutive cylinders of the engine one after another during regeneration.

4. A system according to claim 1, wherein the pollution-control means comprise a particulate filter.

5. A system according to claim 4, wherein the particulate filter is a catalysed particulate filter.

6. A system according to claim 1, wherein the pollution-control means comprise a NOx trap.

7. A system according to claim 2, wherein the pollution-control means comprise a NOx trap.

8. A system according to claim 3, wherein the pollution-control means comprise a NOx trap.

9. A system according to claim 1, wherein the pollution-control means comprise a catalysed or non-catalysed particulate filter associated with a NOx trap.

10. A system according to claim 2, wherein the pollution-control means comprise a catalysed or non-catalysed particulate filter associated with a NOx trap.

11. A system according to claim 3, wherein the pollution-control means comprise a catalysed or non-catalysed particulate filter associated with a NOx trap.

12. A system according to claim 1, wherein the supply means comprise means for providing a pre-injection of fuel into the engine cylinders before the principal injection.

13. A system according to claim 1, wherein the supply means comprise means for cutting at least the principal injection and maintaining the post-injection of at least one of the cylinders during regeneration.

* * * * *